US010753850B2

(12) United States Patent
Mehrle et al.

(10) Patent No.: US 10,753,850 B2
(45) Date of Patent: Aug. 25, 2020

(54) DROP-DETECTION DEVICE

(71) Applicant: VERMES MICRODISPENSING GMBH, Otterfing (DE)

(72) Inventors: Klaus Werner Mehrle, Otterfing (DE); Jiri Karger, Munich (DE)

(73) Assignee: VERMES MICRODISPENSING GMBH, Otterfing (DE)

( * ) Notice: Subject to any disclaimer, the term of this patent is extended or adjusted under 35 U.S.C. 154(b) by 99 days.

(21) Appl. No.: 15/765,594

(22) PCT Filed: Oct. 6, 2016

(86) PCT No.: PCT/EP2016/073851
§ 371 (c)(1),
(2) Date: Apr. 3, 2018

(87) PCT Pub. No.: WO2017/060336
PCT Pub. Date: Apr. 13, 2017

(65) Prior Publication Data
US 2019/0078996 A1    Mar. 14, 2019

(30) Foreign Application Priority Data

Oct. 9, 2015  (DE) ........................ 10 2015 117 248

(51) Int. Cl.
*G01N 15/14*  (2006.01)
*F16K 17/168*  (2006.01)
(Continued)

(52) U.S. Cl.
CPC ....... *G01N 15/1456* (2013.01); *B05B 12/082* (2013.01); *B05C 11/1002* (2013.01);
(Continued)

(58) Field of Classification Search
CPC .... G01N 15/10; G01N 15/1031; G01N 15/14; G01N 15/1425; G01N 15/1429; G01N 15/1456; G01N 2015/1481
(Continued)

(56) References Cited

U.S. PATENT DOCUMENTS 4,255,754 A   3/1981  Crean et al.
4,260,882 A   4/1981  Barnes
(Continued)

FOREIGN PATENT DOCUMENTS

DE   10 2006 014 858 A1   12/2006
EP         1 946 843 A1    7/2008
(Continued)

OTHER PUBLICATIONS

International Search Report issued in PCT/EP2016/073850; dated Mar. 3, 2017.
(Continued)

*Primary Examiner* — Benjamin R Schmitt
(74) *Attorney, Agent, or Firm* — Studebaker & Brackett PC

(57) ABSTRACT

A drop-detection device (11, 11a, 11b) for the detection of drops (TR) that escape from a nozzle of a metering valve (DV), preferably a micro-metering valve, is described. The drop-detection device (11, 11a, 11b) comprises a signal-generation unit (20), which is configured to produce a carrier signal (TS) with a defined pulse frequency. In addition, the drop-detection device (11, 11a, 11b) has a modulation unit (30, 30a) which is configured to generate a modulated signal (MS) due to a physical interaction of the carrier signal (TS) with a drop to be detected (TR), Furthermore, the drop-detection device (11, 11a, 11b) has an evaluation unit (50), which is configured to determine if a drop (TR) has been dispensed by the metering valve (DV) based on the mea-
(Continued)

Figure 1:
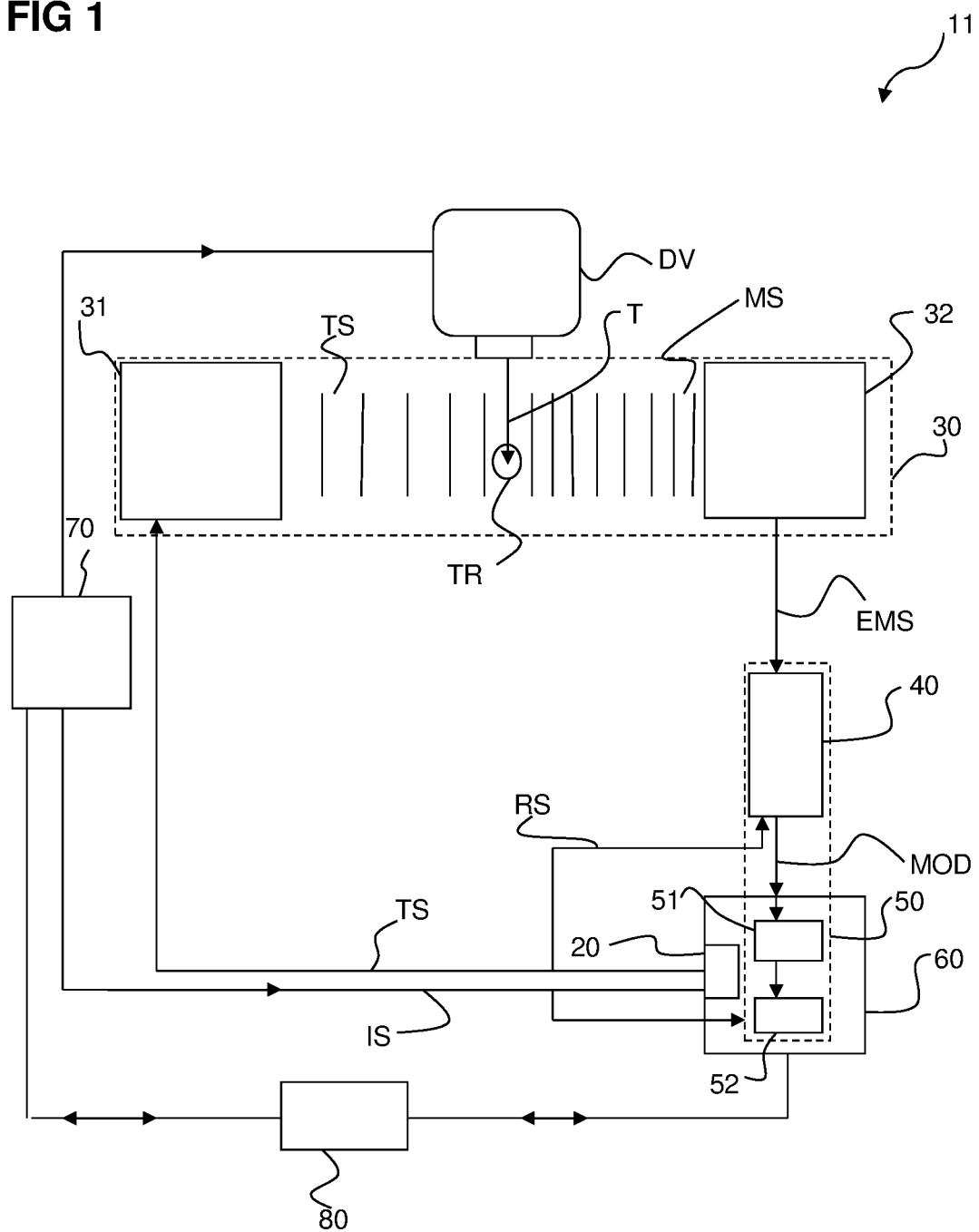

surement signal (MS) under consideration of the defined pulse frequency. A method (600) of detecting a drop (TR) of a metering valve (DV) is also described.

12 Claims, 10 Drawing Sheets

(51) Int. Cl.
| | |
|---|---|
| *B05B 12/08* | (2006.01) |
| *B05C 11/10* | (2006.01) |
| *G01V 8/12* | (2006.01) |
| *G01F 11/44* | (2006.01) |
| *G01N 15/00* | (2006.01) |
| *B05B 12/00* | (2018.01) |
| *B05C 5/02* | (2006.01) |

(52) U.S. Cl.
CPC ....... *F16K 17/168* (2013.01); *G01N 15/1429* (2013.01); *G01V 8/12* (2013.01); *B05B 12/004* (2013.01); *B05C 5/0225* (2013.01); *G01F 11/44* (2013.01); *G01N 2015/0026* (2013.01); *G01N 2015/1481* (2013.01); *G01N 2015/1486* (2013.01)

(58) Field of Classification Search
USPC ............................................ 73/861.41, 865.5
See application file for complete search history.

(56) References Cited

U.S. PATENT DOCUMENTS

| | | | |
|---|---|---|---|
| 4,410,895 A | 10/1983 | Houston et al. | |
| 4,577,197 A | 3/1986 | Crean et al. | |
| 5,267,978 A | 12/1993 | Dirr | |
| 5,275,787 A | 1/1994 | Yuguchi et al. | |
| 5,650,609 A | 7/1997 | Mertins et al. | |
| 2002/0089561 A1 | 7/2002 | Weitzel et al. | |
| 2003/0115004 A1* | 6/2003 | Kalem | G01B 9/02067 702/72 |
| 2004/0149939 A1 | 8/2004 | Dickson et al. | |
| 2006/0222109 A1 | 10/2006 | Watanabe et al. | |
| 2008/0184809 A1 | 8/2008 | Shvets et al. | |
| 2012/0225475 A1 | 9/2012 | Wagner et al. | |
| 2013/0200277 A1 | 8/2013 | Li et al. | |
| 2013/0252237 A1 | 9/2013 | Wagner | |
| 2016/0282264 A1 | 9/2016 | Wagner | |

FOREIGN PATENT DOCUMENTS

| | | |
|---|---|---|
| GB | 1 520 606 A | 8/1978 |
| WO | 99/21031 A1 | 4/1999 |
| WO | 2013/059835 A1 | 4/2013 |

OTHER PUBLICATIONS

International Search Report issued in PCT/EP2016/073851; dated Dec. 13, 2016.
Trivedi et al.; A modular approach for the generation, storage, Mixing, and detection of droplet libraries for high throughput screening; Lab on a Chip; 2010; vol. 10; pp. 2433-2442.

* cited by examiner

DROP-DETECTION DEVICE

The invention relates to a drop-detection device. In addition, the invention relates to a method of detecting a drop from a metering valve, preferably a micro-metering valve.

When applying and dispensing liquid or pasty media, for example, when applying adhesives, metering valves are used. A metering valve comprises a nozzle at the point where the fluid to be dosed is discharged. In the case of conventional needle valves, for metering a defined amount of media, the opening of the metering valve is released by slightly pulling the metering needle out of the valve seat. Thereby, the medium, driven under pre-pressure for example, can flow through the nozzle opening or the valve opening. If the filling process or the metering process should be completed, the nozzle of the metering valve is closed.

In particular, based on the piezo-metering-valve technique, so-called "jet valves" can be set up. Hereby, the distribution of amounts of media takes place by moving the metering needle and a valve tappet back and forth, wherein an amount of media is pushed out of the nozzle opening like a jet when a movement of the metering needle or the valve tappet in the direction of the nozzle opening occurs. This allows for the application of a defined amount of the metering medium also over greater distances between the metering valve and the application surface, for example, on a component to be processed. Thereby, the metering intervals may vary between half a millimetre and a few millimetres depending on the field of application. Jet valves allow for very fine metering to take place with a high level of speed without any contact to the component to be processed. In order to control the distribution of individual drops, sensors are required to detect the drops as well as corresponding evaluation processes.

In the case of optical detection of drops, which, in particular, have been generated by a jet valve beforehand, the following difficulties become evident:

Initially, the smallest distance possible should be upheld between the metering valve and a surface where the drops are applied of a component to be processed. This distance may vary between 0.5 mm and 3 mm depending on the individual application. This specification considerably limits the possible construction height of a drop sensor. Furthermore, the drops to be detected, having diameters of sometimes less than 10 µm, are very small. Furthermore, the speed of the drops, having a velocity of up to 50 m/s, is very high, whereby this results in a very short transit time through a range monitored by a detecting sensor, thereby being several microseconds. The small size and high-speed of the drops require a weak sensor signal with a low signal amplitude and an unfavourable signal/noise ratio, which makes a fail-safe optical detection of a drop very difficult. If one tries to apply an optimal electric sensor, such as a photodetector for example, close to the nozzle of the valve in order to obtain the strongest optical signal and thereby, following the conversion thereof, electrical signal, conflict arises with the small dimensions of the system. For example, due to the lack of space, it is hardly possible to position the entire evaluation electronics directly on the sensor. However, if the evaluation electronics are arranged away from the sensors, there is the problem that the captured electric analogue signal must be transmitted to the evaluation electronics in a fail-safe manner.

In GB 1 520 606, an infusion device with a fluid passage and a drop-detection unit arranged around the fluid passage for monitoring a distributed dose of an infusion is described. The drop-detection unit includes a light-emission unit and a light-detection unit. The light emitted by the light-emission unit crosses the trajectory of the dispersed drops. If a brief shadowing of the light emitted by the light-emission unit occurs due to a drop, this shadowing is captured by the light-detection unit and recorded as an emitted drop. However, the monitoring can be disturbed by scattered light or outer light sources so that reliable detection does not always take place.

Therefore, it is the object of the present invention to develop a drop-detection device that is adapted to the confined space conditions that works in a highly sensitive and fail-safe manner.

This task is solved by means of a drop-detection device and a method of detecting a drop of a metering valve.

A drop-detection device according to the invention for the detection of drops that escape from a nozzle of a metering valve has a signal-generation unit, which is configured to generate a carrier signal with a defined pulse frequency. A pulsed signal should be understood as a carrier signal, which periodically changes with constant characteristic parameters (e.g. frequency, also called the pulse frequency or the carrier frequency, amplitude), for example, being switched on and off at a certain rhythm. The signal initially does not carry any informational with it in an unmodulated state except for the constant characteristic parameters. The information to be transmitted is first received by means of modulation which can be realized by a physical interaction of the carrier signal with an informational source. For example, a carrier signal can be modulated with the aid of the modulation signal or influenced by another physical disturbance, for example, a drop to be detected. In this connection, a change of the carrier signal with regard to one or a plurality of its parameters such as, for example the amplitude, the frequency or the phase, should be understood as modulation. The pulse frequency or carrier frequency should be higher than the frequency of the modulation or the wavelength should be shorter than a "disturbance" of the signal caused by the drop.

In addition, the drop-detection device according to the invention comprises a modulation unit which is configured to generate a modulated measurement signal due to a physical interaction of the carrier signal with a drop to be detected. Beyond this, the drop-detection device according to the invention has an evaluation unit which is configured to determine if a drop has been dispensed by the metering valve based on the modulated measurement signal under consideration of the defined pulse frequency. Preferably, for this purpose, within a demodulation unit, which, for example can be part of the evaluation unit, a modulation signal based on the modulated signal can be determined taking the defined pulse frequency under consideration and, based upon the modulation signal, it is then determined if a drop has been dispensed by the metering valve. In this connection, a signal corresponding to the modulation of the carrier signal due to the drop should be understood as a modulation signal, which can be "separated" again from the carrier signal by means of demodulation. The carrier signal is generated by the signal-generation unit, preferably with the defined pulse frequency and a duty cycle that is optimum for the modulation unit. Preferably, other control signals can be generated by the signal-generation unit matching the carrier signal or being derived from it, such as control signals of a mixer of the demodulation unit with an optimal phase for sideband selection.

Certain signal parameter values of the modulated measurement signal or of the modulation signal, such as, for example, the course of the curve of the temporal dependency of amplitude and phase of the modulation signal corresponds to certain characteristics or dimensions of a drop to be detected. The relationship between the aforementioned signal parameters and the characteristics or dimensions of a drop to be detected must not be directly known for the detection. It is sufficient if it is defined in advance, for example, within a training procedure with the aid of "sample drops" with defined dimensions, which signal parameter values of the modulated measurement signal or the modulation signal indicates a drop with the desired characteristics and dimensions (the "sample drops" used within the training procedure), meaning when a drop is deemed to be detected. Relevant setting parameters can, for example, be found by automatically observing target drops detected within a training process.

In the case of a method of detecting a drop of a metering valve according to the invention, preferably, a pulse carrier signal is generated with a defined pulse frequency. By applying it to a trajectory, on which a possible drop, which is dispensed by the metering valve, is moving, it is ensured that a modulated measurement signal is generated due to a physical interaction of the carrier signal with a drop to be detected, which has been dispensed by the metering valve. This measurement signal primarily corresponds to the unchanged carrier signal if no drop has been dispensed and otherwise, it corresponds to the modified carrier signal caused by the "disturbance" of the drop. The measuring signal is analysed, and on the basis of the modulated signal, it is determined if a drop has been dispensed by the metering valve, taking into account the defined pulse frequency, preferably, by initially generating a modulation signal for further evaluation based on the modulated measurement signal.

Other especially favourable embodiments and further embodiments of the invention result from the dependent claims as well as the following description, wherein the patent claims of a certain category can also be further developed according to the dependent claims of another category and features of various exemplary embodiments can be combined into new exemplary embodiments.

In an embodiment of the drop-detection device, dispensing a drop is checked within a defined window of time, which is synchronised with the drop dispensing control system of the metering valve. In other words, a time window, in which a drop is detected or generally, when a drop is searched for, or, if applicable, a carrier signal is generally emitted, is synchronised with a drop dispensing of the metering valve in such a way that the provided drop dispensing takes place within a time window.

In a special embodiment, the drop-detection device comprises a demodulation unit that is configured to carry out an amplitude modulation of the measurement signal.

In an especially effective embodiment, a quadrature modulation of the measurement signal is carried out in order to determine an in-phase component and a quadrature component. For this purpose, the demodulation unit can be configured accordingly.

Preferably, the amount of amplitude and/or the phase of the modulation signal based on the modulated measurement signal can be determined on the basis of the in-phase component and the quadrature component. For example, amplitude and phase of the modulation signal can be acquired by means of polar-coordinate transformation of the in-phase component and the quadrature component. To do this, the evaluation unit of the drop-detection device can preferably have a modulation valuation unit that is configured for this.

In a special variation of the drop-detection device, this, in particular, the modulation valuation unit is configured to determine amplitude derivative values, comprehensively the time derivative, comprising the time derivative of the amplitude value and/or phase derivative values, comprising the time derivative of the phase of the modulation signal.

In a preferred embodiment, the drop-detection device, in particular, the modulation valuation unit is configured to combine a predetermined number of amplitudes derivative values into amplitude comparative values at a predefined fixed time interval of the time window and/or, at a second predefined fixed time interval of the time window predetermined time interval of the time window, to combine a predetermined number of the phase derivative values into the phase comparative values. For example, the combination of the amplitude derivative values and the phase derivative values can comprise a summation or adding a plurality of amplitudes derivative values into amplitude comparative values and a summation or a summation or addition of a plurality of phase derivative values into phase comparative values. In principle, the two time intervals for the combination of the amplitude derivative values and the combination of the phase derivative values are determined during the training phase or during the aforementioned training procedure. Thereby, during the training of the time intervals, values are continuously acquired without any time restrictions. The time intervals are determined in such a way that a defined number of maximum values for the amplitude derivative values and the phase derivative values can be acquired at these time intervals. The time intervals for the amplitude derivation values and the phase derivative values are preferably determined independently of one another. That means, its time duration and its start time are independent from each other.

For example, a time interval can be set in such a way that it comprises 50 measurement values, if the number of maximum values, 10 for example, within such a large range. After specifying this range, after the training phase, the 10 maximum values from these 50 measurement values comprising a time interval are always determined or searched for and further used.

Based on the amplitude comparative values and/or the phase comparative values, it can preferably be determined if the modulation signal indicates a drop. Therefore, in addition to the modulation valuation unit, the evaluation device of the drop-detection device according to the invention preferably comprises a detection filter unit that is configured to determine if the modulation signal indicates a drop based on the amplitude comparative values and/or the phase comparative values.

In order to detect a drop, in particular, the detection filter unit of the drop-detection device can be configured to determine a deviation of a amplitude comparative value, for example, determined by the modulation valuation unit, from an amplitude reference value and/or a deviation of a phase comparative value determined, for example, by the modulation valuation unit, from a phase reference value. An amplitude reference value can be formed, for example, by a plurality of amplitude comparative values of previously collected modulation signals. A phase reference value can be formed, for example, by a plurality of phase comparative values of previously collected modulation signals. When forming the reference values, it should be ensured that only comparative values which have been classified as correctly detected drops are part of the determination of the reference values.

In a special embodiment, the drop-detection device can have a reference value storage device, in which an amplitude reference value, which is formed by a plurality of amplitude comparative values from previously recorded modulation signals, and/or a phase reference value, which is formed by a plurality of phase comparative values from previously recorded modulation signals, are saved as variable reference values. From this, a continuous adaptation of the reference values in the case of a slow global average fluctuation of the comparative values results with reference to the comparative values of an individual drop. With relation to the comparison of the comparative values with an absolute factor, by means of this, the permitted fluctuation ranges with reference to the reference values can be reduced.

In order to determine if a drop has been detected, the drop-detection device, particularly the detection filter unit, is configured to determine if the detected deviation of the amplitude comparative value from the amplitude reference value and/or the detected deviation of the phase comparative value from the phase reference value do not exceed a maximum value. The reference values are acquired during the normal detection process on a continual basis. They represent a type of target value in connection with the relative permitted variances determined from the filter training phases. The permitted relative variances represent empirical factors since they are determined during the filter training. If the determined comparative values are too far away from the target value, this concludes that either no drop or at least no regular drop was detected.

In an especially preferred variation, it is determined if the amplitude reference value used to determine the deviation of the amplitude comparative value is within a predetermined amplitude reference value range and/or if the phase reference value used to determine the deviation of the phase comparative value is within a predetermined phase reference value range. For this purpose, in turn, the detection filter unit can be configured accordingly. For example, within a reference value storage device, a fixed reference value range for the amplitude and phase reference values can be respectively stored. Such a fixed reference value range can, for example, be determined within a training phase, in which a possible fluctuation range of a reference value is also measured. If the reference value used is not within the fixed reference value range, it is assumed that, primarily non-regular drops have contributed to determining the reference value in such a way that such a reference value is no longer deemed reliable. For example, in such a case, an investigative result can be classified as being at least unreliable or be thrown out. Such a situation can occur when the dimensions of the drops dispensed by a metering valve change slowly, but continuously. Now, if a reference value is formed based in such altered modulation values or comparative values, in an unfavourable case, a reference value may also correspond to a non-correct drop, which deviates too much from a predetermined target drop. In order to avoid such an error, it is preferred to determine a fixed range for the reverence values, away from which this is not allowed to deviate. If it is determined that the reference value is no longer within the predetermined range, a notification to the user of the drop-detection device can be, for example, given, entailing that the system is no longer properly calibrated. The user can then take counter-measures. For example, the user can check to ensure that the metering valve is functioning properly and eliminate any functional faults. Then, for example, after restarting the system, correct reference values can be determined. The reference values in this case are determined after restarting in a type of preparatory phase and updated during the measurement process by forming averages of the current measurement values with the reference values up to that point.

In an especially practical embodiment of the drop-detection device according to the invention, the modulation unit comprises a light-emission unit and a light-sensor unit. A light diode, in particular, a semiconductor diode, can be used as a light-emission unit, which converts an electrical carrier signal into a light signal. The light-sensor unit may, for example, comprise a sensor that is based on photoelectric effect, preferably a semiconductor sensor.

In addition, the modulation unit of the drop-detection device according to the invention comprises at least two light-guiding elements. These light-guiding elements are preferably connected to the light-emission unit and the light-sensor unit in such a way and positioned in such a way that the light emitted by the light-emission unit is led to a trajectory of a drop emitted by the metering valve, crosses the trajectory of the drop and is lead to the light-sensor unit. In other words, one of the two light-guiding elements leads the light generated by the light-emission unit to a range, through which a drop emitted by the metering valve is expected to fly through. The other light-guiding element is preferably positioned opposite to the first light-guiding element so that it absorbs the light possibly modulated by a drop in leads it to the light-sensor unit. When using two light-guiding elements as light transport units, in a favourable manner, the arrangement of the light-emission unit in the light-sensor unit directly in the range of the trajectory of the drop can be done without. Thereby, when dimensioning the light-emission unit and the light-sensor unit, it is not necessary to take into account the normally very limited spatial conditions within the area of the nozzle of the metering valve or between the metering valve and the workpiece.

Alternatively or in addition, the drop-detection device according to the invention can also comprise a modulation unit with a capacitive sensor unit. In this case, the principle of the drop-detection system can be based on the modulation of the capacitance of a capacitor, which was caused by a fluctuation of the relative permittivity due to a drop trajectory. In this embodiment, the analysis and evaluation of the modulated signal as well as the generation of an electric carrier signal can be carried out analogue to the other embodiments.

It is especially preferable if the signal-generation unit of the drop-detection device according to the invention is configured to generate a square-wave signal as a carrier signal, which is preferably pulsed, meaning a carrier signal that is square-shaped to the furthest extent possible.

Before the actual drop detection begins, preferably, a calibration of the drop-detection device according to the invention is initially carried out. Thereby, for example, a pulse width of the carrier signal is set in such a way that, for example, in the case of one variation, where a light signal is worked with, an optimal brightness of a light beam formed on the basis of the carrier signal is achieved. Optimum brightness refers to the residual light that reaches and electric sensor, preferably a photodiode, meaning the light which still remains after traveling the entire optical path and hits the photodiode. The intensity of the emitted light and also the residual light thereby received must be chosen in such a way that the sensor is at its maximum level of sensitivity at this operating point. Sensitivity thereby refers to a maximum possible fluctuation of the output current of the photodiode resulting from a slight variance in light intensity. Setting the optimum brightness must be performed when replacing the light-guiding elements.

Figure 3:
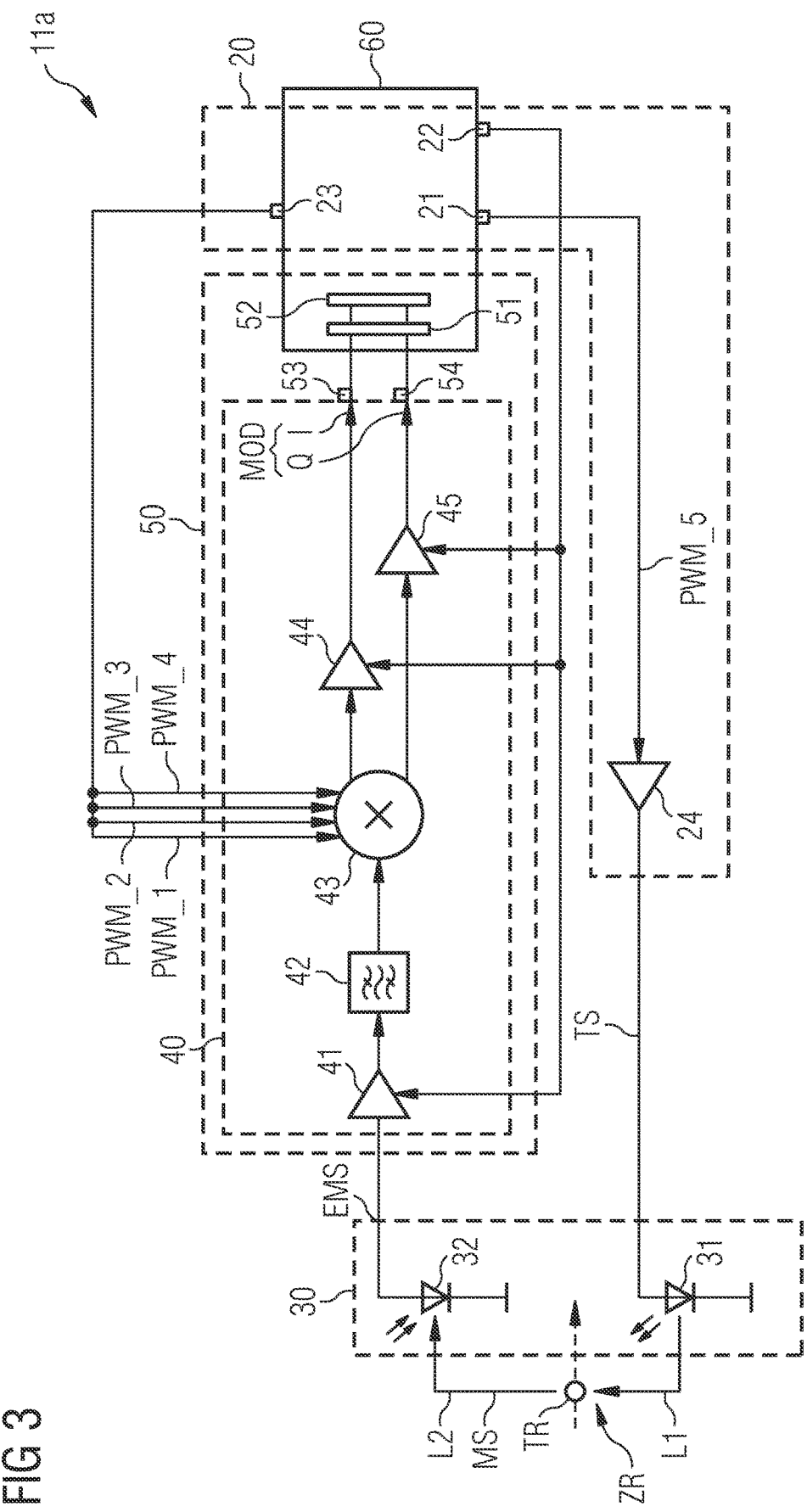

The settings to be carried out concern, for example, the determination of a frequency of the pulsed carrier signal so that the received signal, meaning the carrier signal, as well as the sidebands resulting from the amplitude modulation caused by the drops, can run through the bandpass filter an optimal manner. By the setting the phase position between the carrier signal and the control signals of the demodulation unit, a sideband of the modulated measurement signal is then selected. All the settings mentioned here are hardware parameters that must be changed in principle upon first starting the drop-detection system or when replacing hardware components, for example, also when changing to another light-guiding element length. In addition, there are also parameters for the three amplifier levels (FIG. 3, 41, 44, 54). All hardware parameters can be manually entered, but also found/set within the scope of the Hardware TeachIn (or hardware training phase) in an automated manner.

Furthermore, parameters of the detection filter unit can be found in a training phase through the automated observation of "target drops". The adjustable parameters comprise, for example, detection time windows for amplitude/phase comparative values, a relatively permitted range of comparative values in relation to the reference values and a permitted range of reference values. These values change when the metering process of the drop changes. All the parameters of the detection filter unit can be used manually.

Preferably, the activation of the carrier signal occurs synchronously with the reception of a control signal to open the metering valve, which the control unit of the metering valve (valve control unit), sends to the drop-detection system. Thereby, the control signal is preferably formed as a square-wave signal, which is emitted both for opening the metering valve as well as for closing the metering valve. The actual drop ejection occurs when the metering valve closes. The activation of the carrier signal already occurs with the first rising edge of the control signal to open the metering valve, since the control signal requires several microseconds to stabilise. The reaction of the evaluation unit first occurs at the second rising edge of the control signal, meaning when the actual ejection of drops begins. This is because, only in this moment does the possibility exist that a drop passes the modulation unit. In this way, the temporal behaviour of the actual jet operation can be detected extremely accurately.

The invention is explained once again below with reference to the enclosed figures on the basis of exemplary embodiments. Thereby, identical components in the various figures are provided with identical reference numbers. The figures are generally not to scale. The figures show:

FIG. 1 is a schematic representation of a drop-detection device according to an exemplary embodiment of the invention.

Figure 2:
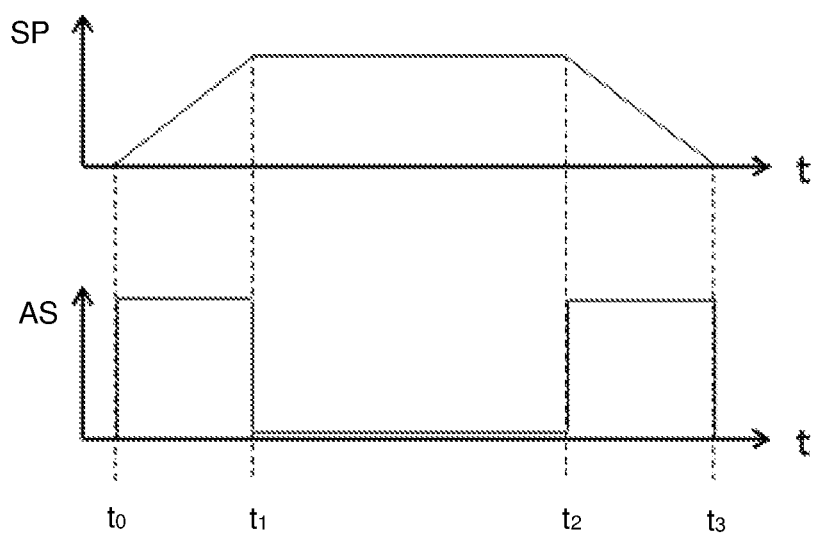
Figure 4:
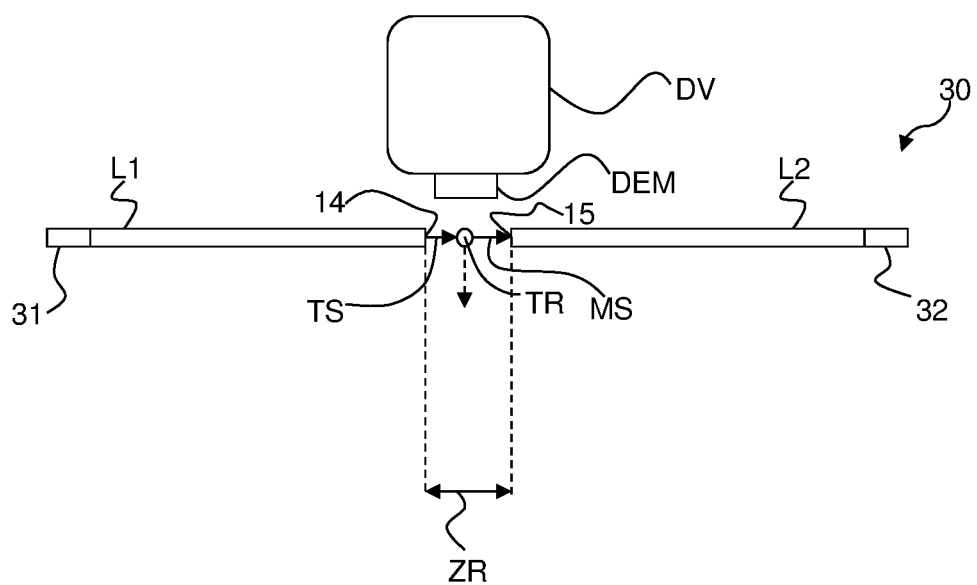
Figure 5:
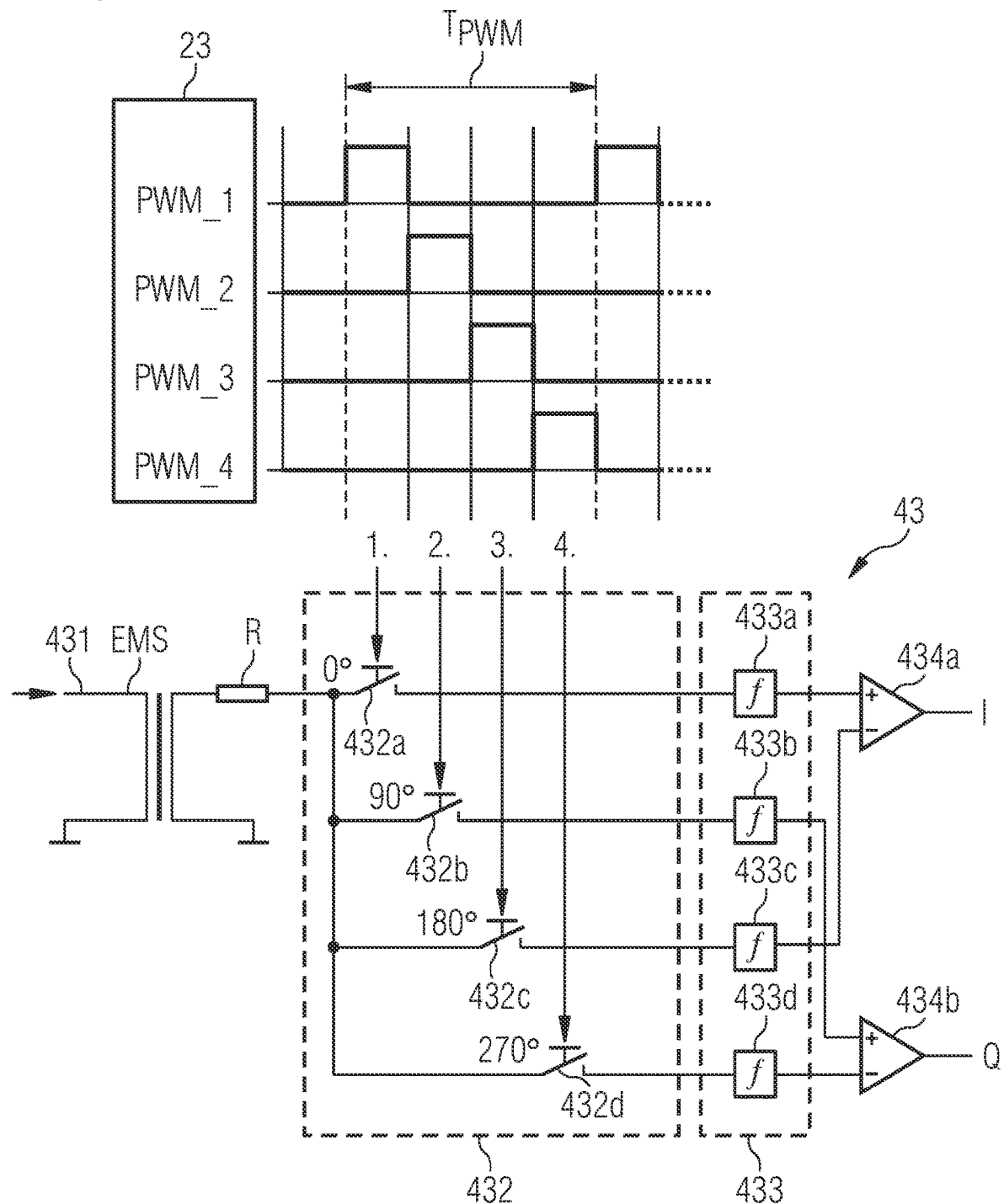
Figure 6:
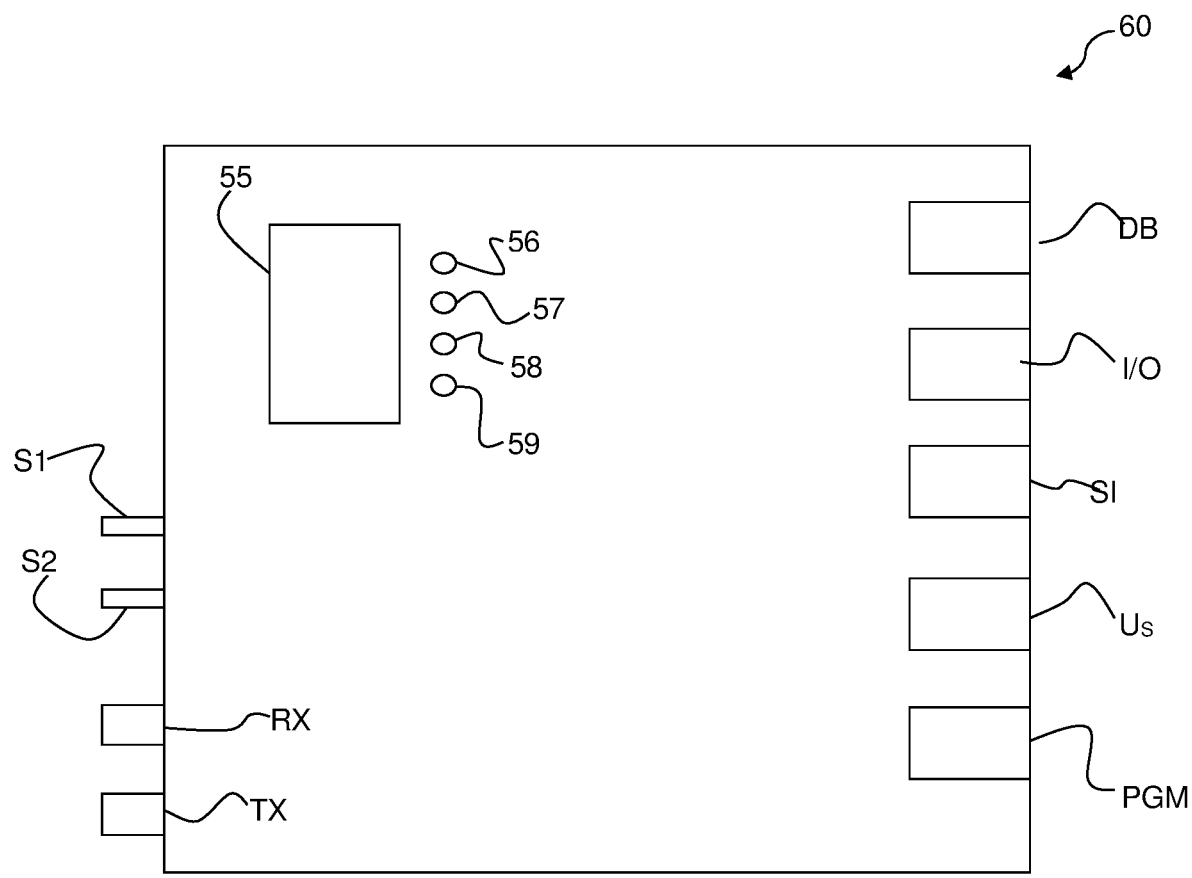

FIG. 2 a graph which shows the chronological sequence of a drop-detection process, FIG. 3 is a more detailed schematic representation of a drop-detection device according to an exemplary embodiment of the invention, FIG. 4 is a schematic representation of a modulation unit of a drop-detection device in accordance with an exemplary embodiment of the invention, FIG. 5 is a detailed schematic representation of a mixer unit of a demodulation unit of a drop-detection device in accordance with an exemplary embodiment of the invention, FIG. 6 a schematic representation of a control unit of a drop-detection device according to an exemplary embodiment of the invention.

Figure 7:
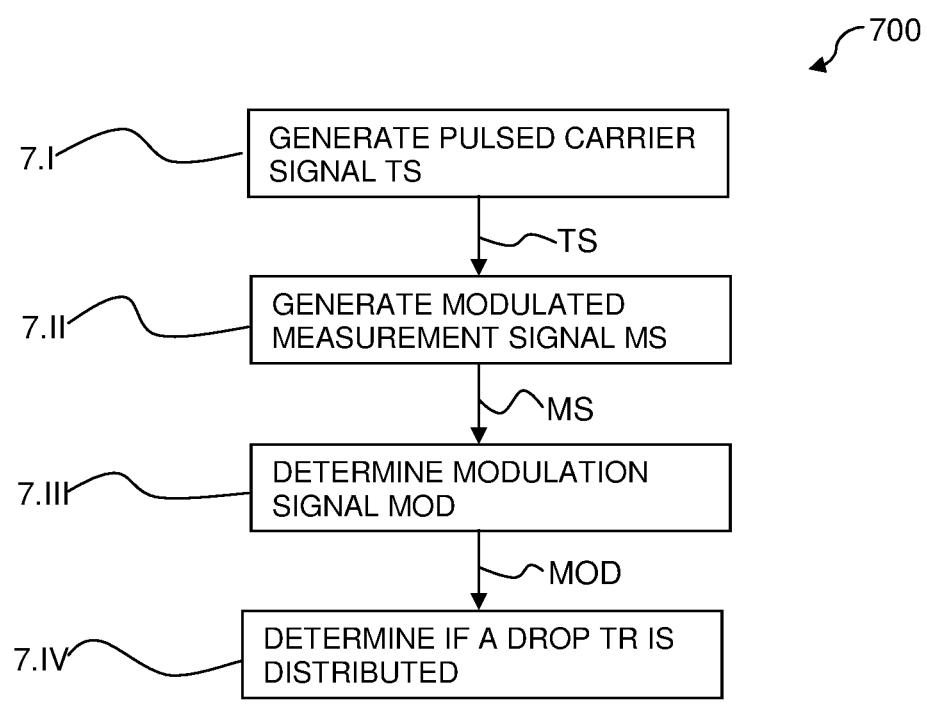
Figure 8:
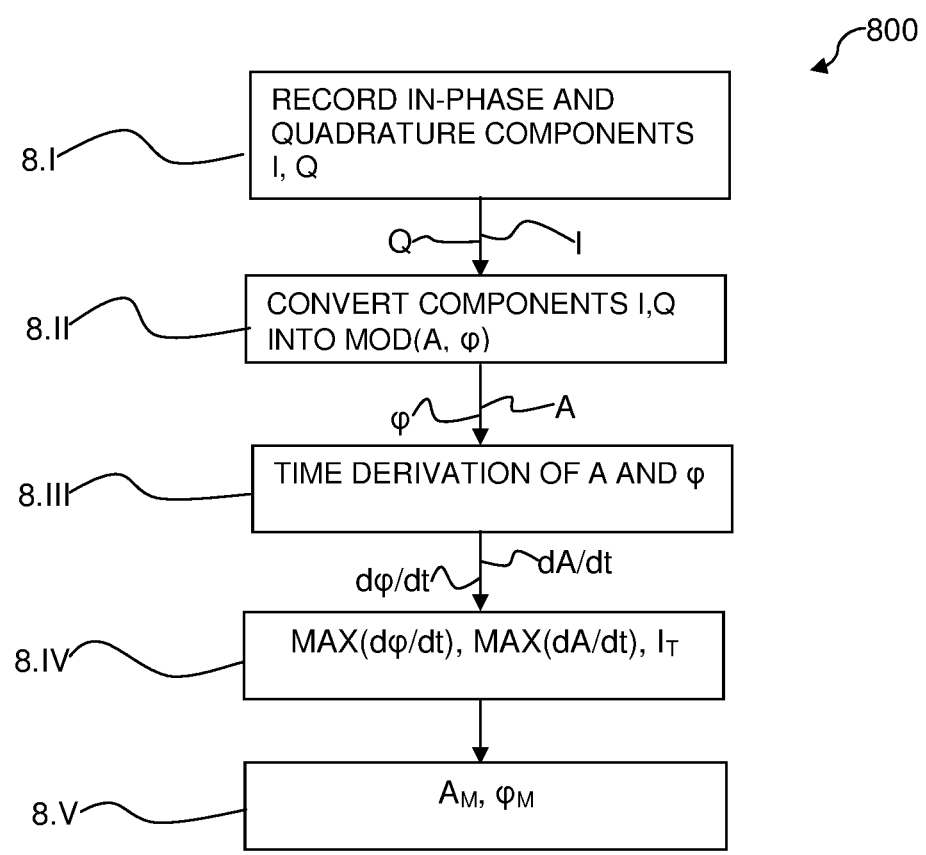
Figure 9:
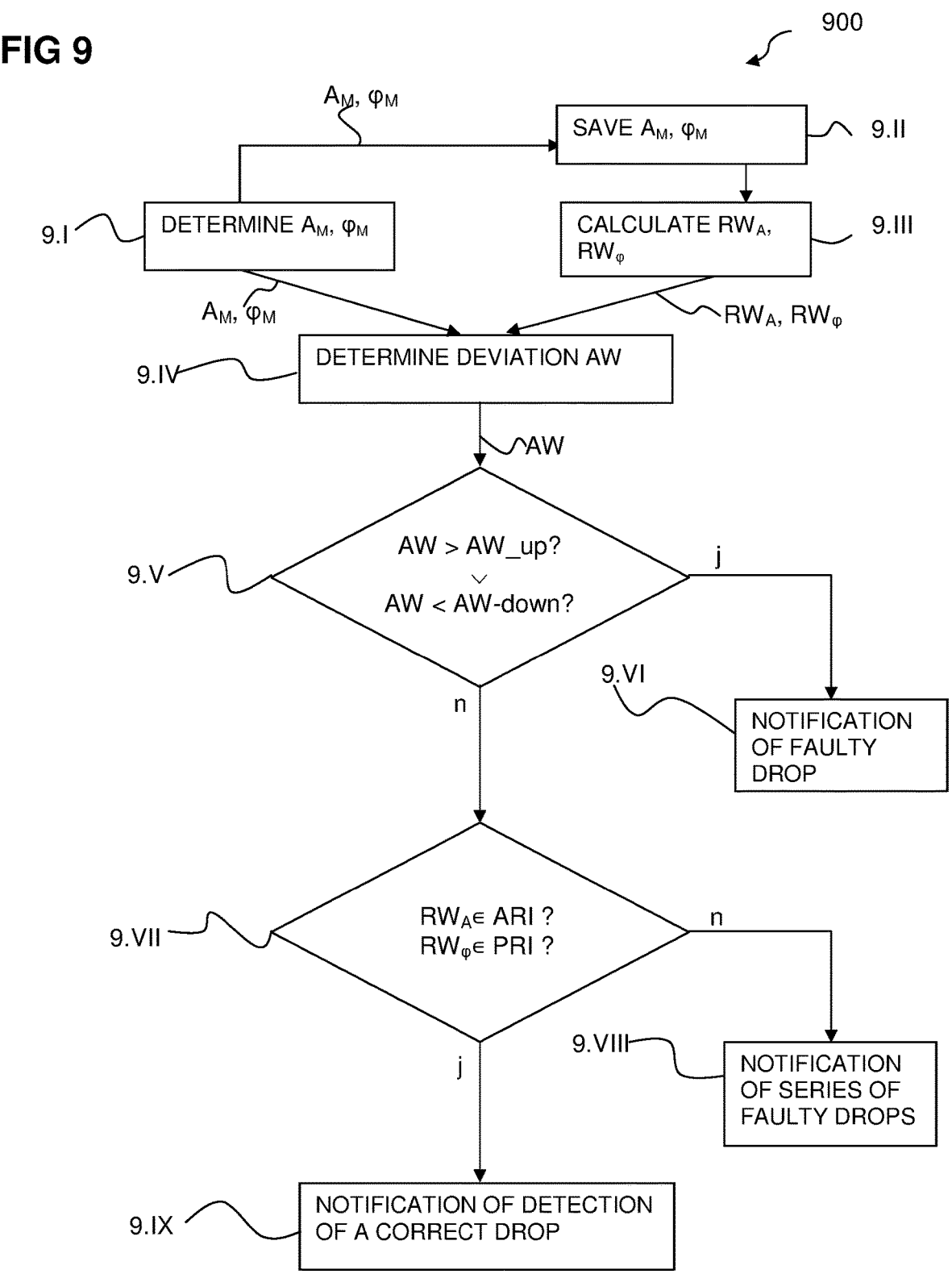
Figure 10:
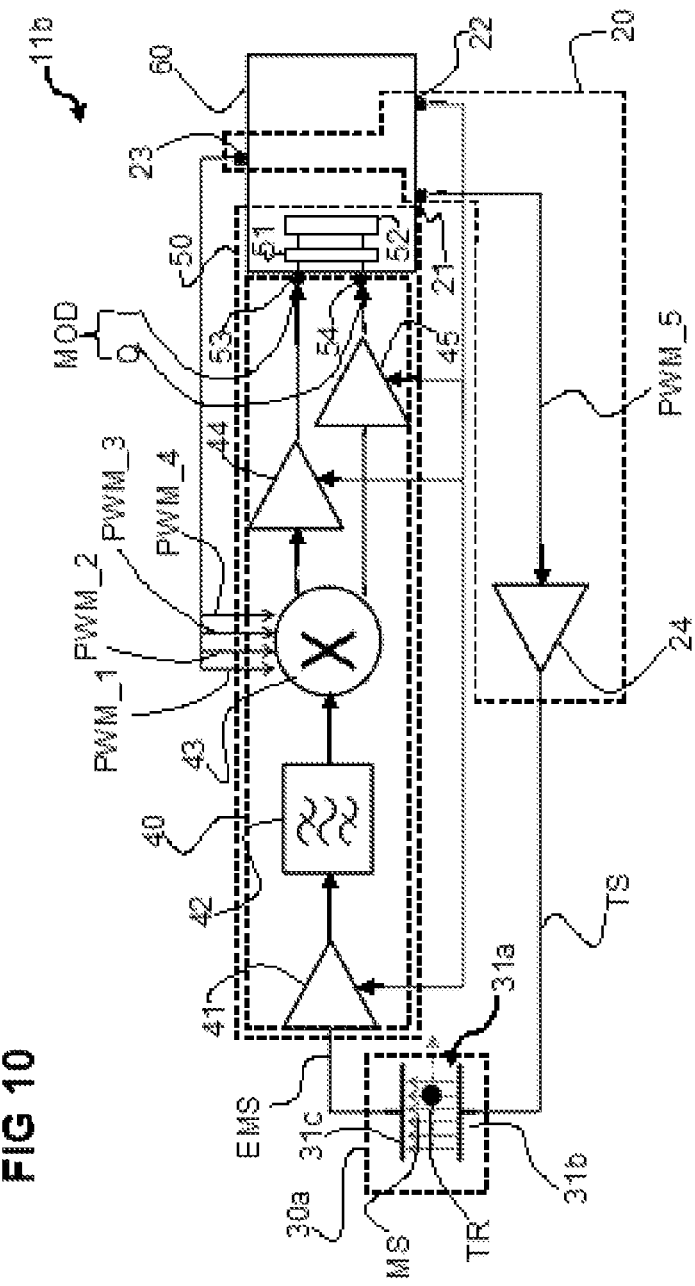

FIG. 7 a flowchart, with which a method is illustrated according to an exemplary embodiment of the invention, FIG. 8 a flow chart, with which the functional principle of the modulation valuation unit shown in FIGS. 1 and 3 is illustrated in detail, FIG. 9 a flow chart, with which the functional principle of the detection filter unit shown in FIGS. 1 and 3 is illustrated in detail, FIG. 10 a schematic representation of a drop-detection device according to an alternative exemplary embodiment of the invention.

In FIG. 1, a drop-detection device 11 according to a very simplified principle exemplary embodiment of the invention at a metering valve DV is schematically shown. The drop-detection device 11 comprises a signal-generation unit 20. The signal-generation unit 20 generates a carrier signal TS with a defined pulse frequency or carrier frequency. The carrier signal TS is transmitted to a modulation unit 30, which is configured to apply a modulation signal to the carrier signal TS (depending on a drop to be detected).

The modulation unit 30 comprises an intermediate space, in which a trajectory T of a drop TR runs, which has been dispensed by the metering valve DV. In the exemplary embodiment shown in FIG. 1, the modulation unit 30 comprises a first signal conversion unit 31, which converts the generated carrier signal TS into a signal form, by means of which an interaction of the carrier signal TS with a drop to be detected TR is possible. A second signal conversion unit 32 is arranged opposite to the first signal conversion unit 31, which converts a measurement signal MS that is possibly modulated by a drop to be detected TR into an electrically transmittable and electrically further processable signal EMS again. The signal conversion units 31, 32 can also additionally comprise signal supply units and signal transfer units (see FIG. 2), which ensure an undisrupted supply and transfer of a signal possibly interacting with a drop TR within the intermediate space between the two signal conversion units 31, 32.

The modulated electrical measurement signal EMS is transmitted by the modulation unit 30 further to an evaluation unit 50. The evaluation unit 50 includes a demodulation unit 40, which demodulates the electric modulated measurement signal EMS. That means a modulation signal MOD (which contains information on if an interaction between the carrier signal and a drop has occurred) of the electrically modulated measurement signal EMS is separated from the carrier signal TS and then transmitted to a modulation valuation unit 51, which is part of a control means 60 in the first exemplary embodiment shown in FIG. 1.

The modulation valuation unit 51 determines comparative values such as, for example, amplitude comparative values or phase comparative values based on the modulation signal MOD. The comparative values are transmitted to a detection filter unit 52, with checks if a drop TR has been dispensed with the desired dimensions from the metering valve DV or not based on the aforementioned comparative values and reference values determined beforehand.

Furthermore, the signal-generation unit 20 can be electrically connected to the demodulation unit 40 in order to transmit a reference signal RS to the demodulation unit 40, for example, the generated carrier signal TS or a carrier signal shifted by a certain phase. The signal-generation unit 20 and/or the evaluation unit 50 can additionally be connected to a valve control unit 70 of the metering valve DV on a signal-technical level. For example, the control unit of the metering valve DV transmits an initiation signal IS or trigger signal to the signal-generation unit 20 and/or to the evaluation unit 50, with which the aforementioned units 20, 50 can be started each time shortly before the metering valve DV dispenses a drop TR. The valve control unit 70 determines both the starting point of a scanning window as well as the start of the carrier signal's (TS) generation. For determining the start point in time of the reading window, the start signal IS is transmitted to the evaluation unit 50. For the launch of the carrier signal generation, the start signal is additionally transmitted to the signal-generation unit 20. In addition, a process control computer 80 is activated between the valve control unit 70 and the control means, which contains information on the current drop dosage from the control means 60.

In FIG. 2, the timing of drop detection is illustrated using a diagram, in the upper part of which, the tappet position SP of the metering valve DV is illustrated as a function of time t. In the lower part of the graph in FIG. 2, the temporal course of a control signal AS to control the tappet position is illustrated. At the same time the tappet of the metering valve DV is activated by the valve control unit 70 at the point in time $t_0$, and an initiation signal IS is sent to the signal-generation unit 20 by the valve control unit 70, which then generates a carrier signal TS. The activation of the carrier signal TS already occurs with the first rising edge of the control signal of the metering valve DV, since the control signal requires several microseconds to stabilise. At the same time, the initiation signal IS is also transmitted to the evaluation unit 50, which is activated with a delay and starts drop detection at the point in time $t_2$. At the point in time $t_1$, the tappet of the metering valve DV reaches a position at which the valve is completely open. At the point in time $t_1$, a stop to the metering valve activation occurs with the aid of the control signal. At the point in time $t_2$, a closing process of the metering valve DV is started. Between the points in time $t_2$ and $t_3$, a drop is emitted by the metering valve DV and a detection of the drop occurs with the aid of the evaluation unit 50. At the point in time $t_3$, the metering valve is fully closed again in the trigger signal IS is stopped so that the carrier signal TS is also terminated with a certain delay. The reaction of the evaluation unit is delayed at the time $t_2$, ejection process starts. This is because, only from this moment on is it possible for a drop to pass the modulation unit 30. The sent trigger signal IS of the valve control unit 70 serves as an initiation signal to the signal-generation unit 20 for generating the carrier signal TS. The detection filter unit 52 serves as a time basis for the filter time window. The filter time window always refers to this trigger signal.

In FIG. 3, a drop-detection device 11a according to an especially preferred exemplary embodiment of the invention is shown in detail. The drop-detection device 11a like the drop-detection device 11 shown in FIG. 1 in accordance with a first exemplary embodiment of the invention, comprises a signal-generation unit 20 which is been drawn into FIG. 3 using a dotted line. In this exemplary embodiment, the signal-generation unit 20 comprises a transmission signal-generation unit 21, which generates a transmission signal PWM_5 with a defined specifiable pulse frequency, for example, as a pulsed square-wave signal. The generated transmission signal PWM_5 is transmitted to a power amplifier of 24, which amplifies the transmission signal PWM_5 to a carrier signal TS. The signal-generation unit 20 comprises a second signal-generation unit 23, which is configured to transmit pulsed control signals PWM_1, . . . , PWM_4, which are phase shifted with relation to the carrier signal, to a mixer unit 43 of a demodulation unit 40. The pulse frequency of the control signals PWM_1, . . . , PWM_4 for the mixer 43 is always equal to the frequency of the transmission signal PWM_5. The phase shift between the control signals PWM_1, . . . , PWM_4 and the transmission signal is variable. The pulse frequency is preferably 450 kHz+–15 kHz. The determination of the frequency of the carrier signal serves to ensure that the received signal (the carrier signal and sidebands resulting from the amplitude modulation caused by the drop) can optimally run through the bandpass filter.

By the setting of the phase position between the carrier signal and the control signals of the demodulation unit, a sideband is then selected. The carrier frequency must be higher than two times the frequency resulting from the drop transit time through the modulation unit 30 in accordance with the sampling theorem.

The carrier signal TS is transferred from the amplifier 24 to a modulation unit 30. Like the modulation unit 30 shown in FIG. 1, the modulation unit 30 comprises first and second signal conversion units 31, 32. In the exemplary embodiment shown in FIG. 3, the first signal conversion unit 31 comprises a light-emission unit. The light-emission unit may be. for example, a light-emitting diode, which lights up according to the carrier signal TS adjacent to the LED. In other words, the carrier signal, which is initially a pulsed electrical current, is converted into a pulsed light signal. Here, the signal conversion unit 31 is connected to a first light-guiding element L1, that leads the pulsed light signal to an intermediate space ZR, in which a trajectory of a drop TR to be detected of a metering valve runs. Arranged opposite to the first light-guiding element L1, there is a second light-guiding element L2, which is connected to a second signal conversion unit 32 and conveys a light signal MS modulated by a drop TR to the second signal conversion unit 32. The second signal conversion unit 32 comprises, for example, a photodetector, which receives the modulated light signal MS and converts it again into an electrically modulated signal EMS that can be transported by an electrical line.

The electrical modulated signal EMS is then transmitted by the modulation unit 30 further to an evaluation unit of 50, which also has a demodulation unit 40. The demodulation unit 40 comprises an amplifier unit 41, which amplifies the modulated signals EMS. The amplifier unit 41 is controlled via a control signal output 22 of the signal-generation unit 20 and, on the one hand, serves to pre-amplify the modulated signal EMS detected by the photodetector 32 and, on the other hand, as a transimpedance amplifier Thereby, the photo detector 32 is pretensioned in the blocking direction and operated in a quasi-short-circuit. By means of this, only the emission of a linear current from the photodetector 32 depending on the lighting strength across many factors without voltage fluctuation still takes place. By means of this, the bandwidth of the detector, which is normally limited due to the terminal capacitance, is considerably higher since no reversal of the capacitance takes place. Due to the pretensioning, in addition, a further reduction of the capacitance is achieved, whereby another increase in the achievable bandwidth goes hand in hand. In addition, a transfer of the power signal takes place into a voltage signal due to the transimpedance amplifier. The amplification factor of this implementation is adjustable. By means of this, a maximum voltage-driven signal modulation is achieve, which is dependant of the drop shadowing.

Furthermore, the demodulation unit 40 comprises a filter unit 42. The filter unit 42 can, for example, comprise a bandpass filter, which only lets through both sidebands and the carrier frequency of the modulated signal EMS. The filter unit 42 furthermore removes possible disruptive signals caused by an external light irradiation, for example, with frequencies far away from the pulse frequency of the carrier signal TS. In addition, the filter unit 42, preferably a deep-edged bandpass filter, also removes the harmonic waves generated by the pulse width modulation. The modulated measurement signal EMS filtered in this way is then sent on to a mixer 43, which mixes the modulated and filtered measurement signal EMS with the pulsed control signals PWM_1, . . . , PWM_4, which are phase shifted with relation to the carrier signal and generated by the second signal-generation unit 23 and an in-phase signal or an in-phase component I is transmitted to an in-phase signal amplifier 44 and a quadrature signal or a quadrature component Q is transmitted to a quadrature signal amplifier 45. The phase-correct control of the mixer 43 causes the demodulation of only a sideband. The in-phase signal amplifier 44 and the quadrature signal amplifier 45 are controlled by a control signal output 22 of the signal-generation unit 20. The amplifiers 41, 44, 45 are controlled separately from each other. They are respectively set via a varying resistor (rheostat) that can be programmed via a data bus (e.g. 120 bus), which affects feedback. Thereby, each rheostat (and thus amplifier) is adjusted individually. Thereby, the setting of the amplifier 41 with regard to the value is completely independent of the amplifiers 44 and 45. However, the amplifiers 44 and 45 always have the same value in order not to change the relation between the I and the Q signal. However, also these are controlled separately from each other. The function of the mixer unit 43 is explained in FIG. 4 in detail and will be explained in further detail later on. The in-phase component I and the quadrature component of Q form the modulation signal MOD.

After the amplification of both signal components I, Q has taken place within the amplifiers 44, 45, within the evaluation unit 50, both components I, Q are transmitted to the subunits of the evaluation unit 50, which are part of the control unit 60 in the exemplary embodiment shown in FIG. 2. The control unit 60 comprises corresponding inputs 53, 54 for the signal components I, Q. The A-D converters (not shown), which convert the analogue signal components I, Q into digital signals, are connected downstream from the inputs 53, 54. The amplifiers 44, 45 of the demodulation unit 40 can be adjusted with regard to their amplification factor and serve to increase the signal components I, Q of the modulation signal MOD generated by the mixer unit 43 to an optimal voltage level for the A-D converter. This ensures maximum utilization of converter resolution. In order not to take the A-D converters to their voltage limit specified by a reference voltage due to their steady components available in the components I, Q, only the alternating parts caused by a drop will be amplified.

Furthermore, the evaluation unit 50 includes a modulation valuation unit 51 already described with relation to FIG. 1 and a detection filter unit 52. These subunits of the evaluation unit 50 are part of the control means 60 in the second exemplary embodiment shown in FIG. 3. In the modulation valuation unit 51, the digitised signal components I, Q are mathematically prepared and transformed into amplitude and phase information, for example, with the aid of the polar-coordinate transformation process. The detection filter unit 52, for example, can be designed as a parametrizable filter, with which, using the collected information, a determination can be made and if a drop has passed through the sensor system formed by the modulation unit 30. Before the system 11a begins regular operation, it must be set by two ongoing initialisation operations, which are separate from one another.

On the one hand, all hardware assemblies must be set on a working point that is optimal for detection. These settings comprise the determination of the operating point of the light sensor 32 by the carrier signal duty cycle, the frequency tuning of the carrier signal TS on the filter characteristic of the bandpass filter 42, the setting of the phase position of the mixer signals PWM_1 . . . PWM_4 in relation to the carrier signal to the exact sideband selection, the determination of the optimal amplification factor of the transimpedance amplifier 41 and signal adapting of the I and Q signals to the A-D converter of inputs 53, 54 by the A-D preamplifier 44, 45.

On the other hand, all parameters of the detection filter unit 52 are adjusted with reference to the target drops to be expected TR. This comprises the time window for searching for the derivative maxima for the amplitude and phase values, the permitted relative variances of the comparative values of the reference values of the amplitude and phase values as well as the permitted absolute ranges of the reference values of the amplitude and phase values. Both the hardware and the filter can be set manually or by automatic training processes. These settings are required for the acquiring the modulation value, as well as the signal evaluation with regard to the detection of a drop of TR.

In FIG. 4 a modulation unit 30 as it can be used in the example in accordance with FIG. 3 is shown in detail. The modulation unit 30 comprises a light-emitting diode 31 and a light sensor 32 in the exemplary embodiment shown in FIG. 4. With the aid of a first light-guiding element L1, the pulsed light TS generated by the light diode 31 is led through an emission window 14 to an intermediate space ZR, in which a trajectory of a drop TR emitted by a metering valve DV (with a nozzle adjusting nut DEM) runs. Pulsed light TS is modulated by the drop TR into a modulated light signal MS. The modulated light signal MS is coupled into a second light-guiding element L2 via a detection window 15 and led to the light sensor 32. Since the detection process according to the invention is very sensitive to scattered light and other disturbance, however, highly sensitive toward the useful signal, it is favourably not required to use additional optical elements, such as lens systems or the like, at the emission window 14 of the first light-guiding element L1 or at the detection window 15 of the second light-guiding element L2. The exit and entry sides of the light-guiding elements L1, L2 must be level and vertical to the longitudinal axis of the light-guiding element L1, L2 to the furthest extent possible. Since the light sensor 32 in the light-emission unit 31 are located outside of operating range of the metering valve DV, the light sensor 32 and the light-emission unit 31 can be dimensioned independently of the confined space conditions that are predominant within the range of the nozzle adjusting nut DEM of the metering valve. The light-emission unit 31 serves as a signal converter, which converts the unmodulated electrical carrier signal into an unmodulated light signal LS. The light sensor 32 serves as a signal converter, which converts the modulated light signal MS in a modulated electrical measuring signal EMS. The subsequent processing of the modulated electrical measurement signal EMS is described in more detail in relation to FIGS. 3 and 5.

In FIG. 5, a mixer unit 43, a quadrature modulator in this embodiment, is shown in detail. The quadrature demodulator 43 comprises a transmitter 431, a switch unit 432 with parallel switches 432a, 432, 432 c, 432d, an integrator unit 433 with parallel switches 432a, 432, 432 c, 432d, each with downstream integrators 433a, 433b, 433c, 433d, as well as a first and a second differential amplifier 434a, 434b, which are each electrically connected to two integrators. The quadrature demodulator 43 acts as a single-sideband mixer and again sets the electrical modulated measurement signal EMS back into the baseband. The sideband used for the demodulation is selected by a suitable selection of the phase position of the modulated measurement signal EMS in relation to four control signals PWM_1, . . . , PWM_4, which control the switches 432a, 432b, 432c, 432d of the mixer 43 via the differential amplifiers 434a, 434b, which are connected downstream from integrators 433a, 433b, 433c, 433d. As output signals of the differential amplifier 434a, 434 (b), in-phase signals I and quadrature signals Q are generated.

In particular, the mixer unit 43 works as follows: A measurement signal EMS is transferred from the transmitter 431 to the input of the mixer unit 43. The transmitter 431 serves to adapt the performance between various components as well as to balance signals and remove existing offsets. Furthermore, the mixer 43 comprises a resistor R which is connected in series to the output of the transmitter and forms a filter together with the integrators 433a, 433b, 433c, 433d. Control signals PWM_1, . . . , PWM_4 are applied to the switches 432a, 432b, 432c, 432d and incremented by the second signal-generation unit 23, which interconnect one of the switches 432a, 432b, 432c, 432d for a fourth of the period $T_{PWM}$ or a quarter wave of the carrier signal TS. The control signals PWM_1, . . . , PWM_4 are synchronised with the carrier signal TS. If one of the switches 432a, 432b, 432c, 432d is closed, the measurement signal EMS for the time interval, in which the respective switch 432a, 432b, 432c, 432d is closed, is integrated into a an average value by the assigned integrator 433a, 433b, 433c, 433d. The integrators 433a, 433b, 433c, 433d can, for example, comprise parallelly connected capacitors and generate average values of the sections of the measurement signal EMS assigned to the individual quarter waves of the carrier signal TS. An average value integrated into the first quarter wave is at the positive input of the first differentiator 434a marked with a "+" and an average value integrated into the third quarter wave is at the negative input of the first differentiator 434a marked with an "−". An average value integrated into the second quarter wave is at the positive input of the first differentiator 434b and an average value integrated into the fourth quarter wave is at the negative input of the second differentiator 434b marked with an "−". In-phase signal I in the baseband is generated at the output of the first differentiator 434a and a quadrature signal Q in the baseband is generated at the output of the second differentiator. Details about the functionality of such mixed units are described in U.S. Pat. No. 6,230,000 B1.

In FIG. 6, an outer view (of a housing) of the control means 60 is shown, with which the control system of individual units of a drop-detection device 11, 11a, 11b, the evaluation of measurement signals, the monitoring of the functionality of individual units and the settings and tuning of individual system parameters can be carried out. In this case, all of the electronics are accommodated within this housing. In principle, this concerns the whole drop-detection system including the optoelectronic signal converter (receiver photodiode 32, and transmission LED 31). These represent the border of the "optical range", meaning to the transmission light-guiding element L1, to the emission window and to the drop path T, which is located externally.

In future, the data-bus connection DB should, among other things, serve to communicate with the valve control unit. For example, the current status of drop detection or also statistics on the past metering processes (number of detected errors and when these occurred) can be transmitted to this via the data-bus connection DB. Another optional application for this data-bus connection DB entails the drop-detection system being able to prompt the valve control unit to make intentional wrong doses in order to check if the drop detection is functioning properly. This should then surely detect these intentional incorrect doses.

Part of the control means 60 also includes a communication interface I/O, with which trigger signals from the valve control unit 70 are received and, via which, information on the system status of the drop-detection device in the metering status is indicated.

Furthermore, the control means 60 comprises a serial interface SI, which serves as a connection to a higher-level process control computer 80. The process control computer 80 can control the drop detection via the serial interface SI and/or request status reports on the past doses.

In addition, the control means 60 has an input RX, which serves as a connection of the receiving light-guiding element L2 to the photo element 32. An output TX serves a connection of the transmission light-guiding element L1 to the transmission light-emitting diode 31. Another input $U_S$ serves to supply control means 60 with power. An additional input PGM can be used as a programming socket for transferring firmware.

Beyond this, the control means 60 comprises a display 55 as well as a plurality of control indicator lights 56, . . . , 59. A first indicator light 56 serves to display various system errors. A second control light indicator 57 serves to display the system status and an activity of the system. This status can, for example, concern circumstances in which a light-guiding element L1, L2 is not connected properly, damaged, too long or dirty. A third control light indicator 58 can include a notification that a drop with a correct dosage was detected. A fourth control light indicator 59 can comprise a notification that a metering error has occurred, meaning, for example, that no drop has been detected or the detected drop deviates from the target drop too much.

The control means 60 comprises two pressure switches S1 and S2 to coordinate the individual units of a drop-detection device. For example, by pressing the one switch S1 for a defined span of time (here, for example, 2 sec.), a first training mode, a "hardware training mode" is activated, in which, for example, the settings of a pulse width of the carrier signal TS occur so that an optimum brightness of the light-emission unit 31 with relation to the residual light reaching the light-sensor unit of a light beam formed based on the carrier signal TS is reached, the determination of a frequency of the pulse carrier signal TS occurs so that both sidebands of the modulated signal EMS can pass through a filter unit 42 connected downstream from the sensor device occurs, setting the phase position of the carrier signal TS via the signal PWM_5 in relation to the control signals PWM_1, . . . , PWM_4, with which the mixer unit 43 belonging to the demodulation unit is controlled, and the setting of the amplifier units 44 and 45 occurs to adjust voltage and the amplifier unit 41, which acts as a transimpedance amplifier. The hardware training mode is, for example, carried out during a first commissioning of the drop-detection device or if hardware components have been replaced.

By pressing the other switch S2 for a defined span of time (also, for example, 2 sec.) a second training mode, namely a "software training mode" is activated, in which, for example, the detection filter unit 52 as well as the modulation valuation unit 51 one of the evaluation unit 50 is trained for a new type of drop. Here, the relative permitted fluctuation ranges of the compared values in relation to the reference values, the acquisition time window of the values relevant for the detection filter unit 52, as well as the absolute value ranges of the reference values are determined. This software training mode is carried out, for example, when a new test series is pending, meaning a different sort of drop should be detected.

In FIG. 7, a flowchart is shown with which a method 700 of detecting a drop of a metering valve DV is illustrated. At step 7.I, a pulsed carrier signal TS is generated with a defined pulse frequency and a defined duty cycle. At step 7.II, a modulated measurement signal MS is generated by a physical interaction of the carrier signal TS with a drop TR to be detected, which has been dispensed by the metering valve DV. At step 7.III, a modulation signal MOD is determined based on the modulated measurement signal MS. Then, at step 7.IV, based on the modulation signal MOD, it is determined if a drop TR is distributed by the metering valve.

In FIG. 8, the functional principle 800 of the modulation valuation unit 51 of an evaluation unit 50 shown in FIGS. 1 and 3 is illustrated in detail. At step 8.I, the modulation valuation unit 51 records in-phase and quadrature components I, Q from the inputs 53, 54 shown in FIG. 2 of the A-D converters connected downstream to the control unit 60 of the evaluation unit 50. The sampling of the in-phase signal I and the quadrature signal Q takes place on a continual basis. Thereby, both values I, Q are preferably acquired at the same time. Before being further processed, the values I, Q go through a median as well as average-value filter in order to remove extreme values caused by irradiation interference, ADC conversion errors, etc. At step 8.II, the signal components I, Q are converted into a signal MOD(A, φ) by means of a polar-coordinate transformation process, which comprises information concerning the amplitude A and the phase φ of the modulation signal MOD. For example, A the amplitude is as follows:

$$A = \sqrt{I^2 + Q^2}. \tag{1}$$

Furthermore, the phase φ of the modulation signal MOD results from the following equation:

$$\varphi = \arctan\left(\frac{Q}{I}\right). \tag{2}$$

While I and Q correspond to the amplitudes of the in-phase and quadrature components I, Q of the demodulated signal or the modulation signal MOD. The amplitude A and the phase φ are time-dependent factors like the signal components I and Q. Due to the high sampling rate and fast value acquisition associated therewith, the calculations according to equation 1 and 2 are carried out via look-up tables with linear intermediate value interpolation.

At step 8.III, a time derivation of the amplitude A and the phase φ of the modulation signal MOD(A, φ) occurs. At step 8.IV, derivative values dA/dt, dφ/dt are observed at a predetermined time interval $I_T$ and a number of maximum values of the derivative values dA/dt, dφ/dt determined in advance, for example, the largest 10 values, are selected at a time interval $I_T$. The time interval $I_T$ can, for example, be determined in advance when initialising the entire system or during the detection filter training. At step 8.V, modulation values $A_M$, $\varphi_M$ are shown for the amplitude A and phase φ as a sum of the predetermined number of maximum values.

In FIG. 9, the functional principle 900 of the detection filter unit 52 of the evaluation unit 50 shown in FIGS. 1, 3 and 10 is illustrated in detail. At step 9.I, modulation values $A_M$, $\varphi_M$ for the amplitude A and the phase φ determined by the modulation valuation unit 51 according to the method shown in FIG. 8, also known comparative values, are received. At step 9.II, these comparative values $A_M$, $\varphi_M$ are saved in an electronic storage system. Furthermore, at step 9.III, the saved comparative values are used to calculate reference values. The reference values $RW_A$, $RW_\varphi$ for the amplitude A and the phase φ are determined. These reference values of $RW_A$, $RW_\varphi$ can, for example, be average values from older amplitude and phase values, i.e. comparison values obtained, for example, during an earlier detection of drops.

At step 9.IV, a deviation AW of the modulation values $A_M$, $\varphi_M$ for the amplitude A and the phase φ determined by the modulation valuation unit 51 from the reference values $RW_A$, $RW_\varphi$ is calculated. Then, at step 9.V, a comparison between the respectively determined deviation AW and a maximum permitted relevant deviation upwards AW_up or downwards AW_down takes place. If the deviation is too great, which is marked with a "j" in FIG. 9, a notification is made at step 9.VI that an faulty drop has been detected. The extent of permitted deviation AW_up or AW_down is determined using one or a plurality of target drops during an initialisation procedure or in the aforementioned software training mode of the drop-detection device.

In order to be able to recognise a gradual error, for example, the phenomenon that the size of the drop TR to be detected during a frequently repeated emission of drops from a metering valve DV changes very slowly, the reference values $RW_A$, $RW_\varphi$, meaning, for example, the average values of modulation values $A_M$, $\varphi_M$ from past drops, are also monitored. At step 9.VII, it is determined if the reference values $RW_A$, $RW_\varphi$ for amplitude A and phase φ are within a predetermined absolute value range ARI. PRI. If the reference values $RW_A$, $RW_\varphi$ are not within a predetermined value range ARI, PRI, which is marked with an "n" in FIG. 9, a notification is given at step 9.VIII that only a series of faulty drops is present. The resolution of this error case only occurs after stabilising the average value, meaning when a valid reference value of the past drops is present again. If the reference values $RW_A$, $RW_\varphi$ are not within a predetermined value range ARI, PRI and the relation of the modulation values $A_M$, $\varphi_M$, of the current drops to the reference values $RW_A$, $RW_\varphi$ is within the tolerated relative range, which is marked with a "j" in FIG. 9, a notification is given at step 9.IX that a correct drop has been detected. The output of the results can occur, for example, via the control light indicators 58, 59 shown in FIG. 6.

In FIG. 10, a drop-detection device 11*b* in accordance with another exemplary embodiment of the invention is shown in detail. The drop-detection device 11*b*, as shown in the arrangement 11*a* in FIG. 2 in accordance with a second exemplary embodiment of the invention, comprises a signal-generation unit 20 which is been drawn into FIG. 9 using a dotted line. In the third exemplary embodiment, the signal-generation unit 20 comprises a transmission signal-generation unit 21, which generates a transmission signal PWM_5, for example, as a pulsed square-wave signal. The generated transmission signal PWM_5 is transmitted to a power amplifier of 24, which amplifies the transmission signal PWM_5 to a carrier signal TS. The signal-generation unit 20 comprises a second signal-generation unit 23, which is configured to transmit pulsed control signals PWM_1, . . . , PWM_4, which are phase shifted with relation to the carrier signal, to a mixer unit 42.

The carrier signal TS is transferred from the amplifier 24 to a modulation unit 30. Being different than the modulation unit shown in FIG. 2, the modulation unit 30a comprises a capacitor 31a, preferably a plate capacitor with a first and a second capacitor plate 31b, 31c. In the exemplary embodiment shown in FIG. 9, a capacitor 31a is used as a signal converter instead of the light diode 31 shown in FIG. 2 and the photodetector 32 shown in FIG. 2. The capacitor 31a enables a capacitive coupling of the carrier signal TS from the transmission branch into the reception branch. The capacitor 31a is positioned in such a way that a trajectory T of a drop TR, which is been emitted by the metering valve DV, runs between the capacitor plates 31b, 31c of the capacitor 31a perpendicular to the gradient of the field lines of the generated electrical field. The coupling between transmission and reception branch is affected with the drop of TR. This coupling is independent of the reactance $X_c$ of the capacitor 31a. Slight changes of the reactance $X_c$ of the capacitor 31a, which are caused by the drop TR flying through, lead to a modulation of the carrier signal TS. The reactance $X_c$ is given by the following relationship:

$$X_c = \frac{1}{2 \cdot \pi \cdot f \cdot C}. \qquad (3)$$

Thereby, f is the frequency of the carrier signal TS at the capacitor 31a and C is the capacitance of the capacitor 31a. With constant carrier frequency f, changes of $\Delta X_c$ of reactance $X_c$ depend only on changes $\Delta C$ of the capacitance of the capacitor 31a. From the following formula, the capacitance of the capacitor 31a results in:

$$C = \varepsilon_0 \cdot \varepsilon_r \cdot \frac{A}{d}. \qquad (4)$$

Thereby, $\varepsilon_0$ stands for dielectric constant, $\varepsilon_r$ for the permittivity of the capacitor, 31a, A for the surface of the capacitor plates 31b, 31c and the parameter d for the distance between the capacitor plates 31b, 31c. Since the surface A of the capacitor plates 31b, 31c as well as the distance d between the capacitor plates 31b, 31c are not changed, a change in capacitance C and thereby the reactance $X_c$ is only dependent on a change $\Delta\varepsilon$ in material specific permittivity $\varepsilon_r$. If a drop TR enters the intermediate space between both capacitor plates 31b, 31c, the permittivity $\varepsilon_r$ in this area changes depending on the dosage and the drop material. In this way, the modulation of the carrier signal TS results from the fluctuation of the permittivity εr caused by the drop. Light-guiding elements are not required in this embodiment. For this, the capacitor plates 31b, 31c must be positioned relatively close to the trajectory of the drop TR and, thereby, at the exit of the metering valve DV.

The measurement signal MS possibly modulated by a drop TR is transmitted by the modulation unit 30 and evaluation unit 50 is a modulated electrical measurement signal EMS. Like the exemplary embodiment shown in FIG. 2, the evaluation unit 50 comprises a demodulation unit 40, which primarily also has the same components with the same functions as a demodulation unit 40 in the case of the exemplary embodiment in accordance with FIG. 2.

Thereby, the demodulation unit 40 has an amplifier unit 41, which amplifies the modulated electrical measurement signal EMS. The amplifier unit 41 serves to pre-amplify the modulated electrical measurement signal EMS captured by the modulation unit 30 and is controlled by a control signal output 22 of the signal-generation unit 20. Here, it is designed as a normal voltage amplifier and not, as is the case with the optical detection variation, as a transimpedance amplifier. Furthermore, the demodulation unit 40 also comprises a filter unit 42. The filter unit 42 can, for example, comprise a bandpass filter, which only lets through both sidebands and the carrier frequency of the modulated electrical measurement signal EMS. The filter unit 42 furthermore removes possible disruptive signals caused by disrupted fields, which, for example, comprise signals that are quite far away from the frequency of the carrier signal TS. In addition, the filter unit, preferably a deep-edged bandpass filter, also removes the harmonic waves generated by the pulse width modulation. The modulated electrical measurement signal EMS filtered in this way is then sent onto a mixer 43, which mixes the modulated and filtered measurement signal EMS with the pulsed control signals PWM_1, . . . , PWM_4, which are phase shifted with relation to the carrier signal and generated by the second signal-generation unit 23 and transmits an in-phase signal or an in-phase component I to an in-phase signal amplifier 44 and transmits a quadrature signal or a quadrature component Q to a quadrature signal amplifier 45. The phase-correct control of the mixer 43 causes the demodulation of only a sideband. The in-phase signal amplifier 44 and the quadrature signal amplifier 45 are controlled by a control signal output 22 of the signal-generation unit 20. The amplifiers 41, 44, 45 are controlled separately from each other. They are set via a varying resistor (rheostat) that can be programmed via a data bus (e.g. I2C bus). Thereby, each rheostat (and thus amplifier) is adjusted individually. Thereby, the setting of the amplifier 41 with regard to the value is completely independent of the amplifiers 44 and 45. However, the amplifiers 44 and 45 always have the same value in order not to change the relation between the I and the Q signal. However, also these are controlled separately from each other.

After the amplification of both signal components I, Q has taken place within the amplifiers 44, 45, within the evaluation unit 50, both components I, Q are transmitted to the subunits of the evaluation unit 50, which are part of the control unit 60 in the exemplary embodiment shown in FIG. 2. The control unit 60 comprises inputs 53, 54 for the signal components I, Q. The A-D converters (not shown), which convert the analogue signal components I, Q into digital signals, are also connected downstream from the inputs 53, 54. The amplifiers 44, 45 of the demodulation unit 40 can be adjusted with regard to their amplification factor and serve to increase the signal components I, Q generated by the mixer unit 43 to an optimal voltage level for the A-D converter. This ensures maximum utilization of converter resolution. In order not to take the A-D converters to their voltage limit specified by a reference voltage due to their steady components available in the components I, Q, only the alternating parts caused by a drop will be amplified. Furthermore, the evaluation unit 50 also comprises a modulation valuation unit 51 and a detection filter unit 52. The evaluation unit of 50 is part of a control unit 60 in the exemplary embodiment shown in FIG. 9.

In the modulation valuation unit 51, the digitised signal components I, Q are mathematically prepared and transformed into amplitude and phase information, for example, with the aid of the polar-coordinate transformation process.

The detection filter unit 52, for example can be designed as a parametrizable filter, with which, using the collected information, it is determined whether a drop has passed through the sensor system formed by the modulation unit 30a. Before the system 11a begins regular operation, it must be set by two ongoing initialisation operations, which are separate from one another. On the one hand, all hardware assemblies must be set on a working point that is optimal for detection. These settings comprise the frequency tuning of the carrier signal TS on the filter characteristic of the bandpass filter 42, the setting of the phase position of the mixer signals PWM_1 ... PWM_4 in relation to the carrier signal to the exact sideband selection, the determination of the optimal amplification factor of the transimpedance amplifier 41 and signal adapting of the I and Q signals to the A-D converter of inputs 53, 54 by the A-D preamplifier 44, 45.

On the other hand, all parameters of the detection filter unit 52 are adjusted with reference to the target drops to be expected TR. This comprises the time window for searching for the derivative maxima for the amplitude and phase values, the permitted relative variances of the comparative values of the reference values of the amplitude and phase values as well as the permitted absolute ranges of the reference values of the amplitude and phase values. Both the hardware and the filter settings can be set manually or by automatic training processes In conclusion, it is again pointed out that in the case of the apparatuses described above in detail, these only have to do with exemplary embodiments, which can be modified by the person skilled in the art in various ways without leaving the realm of the invention. Still, the use of the indefinite article "a" or "an" does not rule out that several relevant features can also be available. As well, the term "unit" should comprise components that consist of a plurality, if applicable, also spatially separate subunits. In addition, with the term "unit", a conceptual logical unit can be meant, meaning that the same hardware component can comprise a plurality of these logical units. This also particularly applies, for example, to the modulation unit 30, demodulation unit 40 and, if applicable, also to the signal-generation unit 20 and the evaluation unit 50.

REFERENCE LIST

11, 11a, 11b Drop-detection device
20 Signal-generation unit
21 Transmission signal-generation unit
22 Control signal output of the signal-generation unit
23 Transmission signal-generation unit
24 Power amplifier
30 Modulation unit
30a Modulation unit
31, 32 Signal conversion unit
31a Capacitor
31b, 31c Capacitor plate
40 Demodulation unit
41 Amplifier unit
42 Filter unit
43 Mixer
44 In-phase signal amplifier
45 Quadrature signal amplifier
50 Evaluation unit
51 Modulation valuation unit
52 Detection filter unit
53, 54 Inputs for the signal components I, Q
56 ... 59 Light indicators
60 Control means
70 Valve control unit
80 Process host computer
431 Transmitter
432 switch unit
432a, 432, 432c, 432d Switches
433 Integrator unit
433a, 433, 433c, 433d Integrators
434a, 434b Differential amplifiers
$A_M$ Amplitude modulation value/amplitude comparative value
ARI Amplitude reference value range
AS Control signal
AW Deviation
AW_up Relative deviation upwards
AW down Relative deviation downwards
$d\varphi/dt$ Amplitude derivative value
$d\varphi/dt$ Phase derivative value
DB Data-bus connector
DEM Nozzle adjustment nut
DV Metering valve
EMS Electrical modulated measurement signal
I In-phase signal component
I/O Communication interface
IS Initiation signal
$I_T$ Time interval
L1, L2 Light-guiding element
LS Light signal
max. maximum amount of deviation
MOD Modulation signal
MS Measurement signal/modulated signal
PGM Programming socket for transferring firmware
PRI Phase reference value range
PWM_1, ..., PWM_4 Control signals
PWM_5 Transmission signal
Q Quadrature component
R Resistor
RS Reference signal
$RW_A$ Amplitude reference value
$RW_\varphi$ Phase reference value
RX Input
S1, S2 Pressure switches
SI Serial interface
SP tappet position
T Trajectory
$T_{PWM}$ Period
TR Drop
TS Carrier signal
TX Output
$U_S$ Input for power supply of the control means
ZR Intermediate space
ZW Intermediate space
$\varphi_M$ Phase modulation value/phase comparative value

The invention claimed is:

1. A drop-detection device (11, 11a, 11b) for the detection of drops (TR) escaping from a nozzle of a metering valve (DV), having:
a signal-generation unit (20), which is configured to produce a carrier signal (TS) with a defined pulse frequency,
a modulation unit (30, 30a) which is configured to generate a modulated measurement signal due to a physical interaction of the carrier signal (TS) with a drop to be detected (TR),
an evaluation unit (50), which is configured to determine if a drop (TR) has been dispensed by the metering valve (DV) based on the measurement signal (MS) taking the frequency of the defined pulse into consideration, and a demodulation unit (40) that is configured to carry out a quadrature demodulation of the measurement signal in order to determine an in-phase component (I) and a quadrature component (Q), wherein the evaluation unit (50) comprises a modulation valuation unit (51), which is configured based upon the in-phase component (I) and the quadrature component (Q), to determine the amount of amplitude and/or the phase of the modulation signal (MOD) based on the modulated measurement signal (MS), to determine amplitude derivative values (dA/dt), comprising the time derivative of the amplitude value and/or phase derivative values (dφ/dt), comprising the time derivative of the phase of the modulation signal (MOD), and to combine at a fixed time interval (IT), a predetermined number of amplitude derivative values (dA/dt) into amplitude comparative values (AM) and/or a predetermined number of phase derivative values (dφ/dt) into phase comparative values (φM).

2. The drop-detection device according to claim 1, which is designed in such a way that a dispensing of a drop (TR) is checked within a defined window of time, which is synchronised with the drop dispensing control system of the metering valve (DV).

3. The drop-detection device according to claim 1 with a demodulation unit (40) that is configured to carry out an amplitude demodulation of the measurement signal (MS).

4. The drop-detection device according to claim 1, wherein, at a fixed time interval (IT), a predetermined number of maximum values of the amplitude derivative values (dA/dt) are combined into amplitude comparative values (AM) and/or a predetermined number of maximum values of the phase derivative values (dφ/dt) are combined into phase comparative values (φM).

5. The drop-detection device according to claim 1, wherein the evaluation device (50) comprises a detection filter unit (52), which is configured to determine if the modulation signal (MOD) indicates a drop (TR) based on the amplitude comparative values (AM) and/or the phase comparative values (φM).

6. The drop-detection device according to claim 5, wherein the detection filter unit (52) is configured to determine a relative deviation of an amplitude comparative value (AM) determined by the modulation valuation unit (51) from an amplitude reference value (RWA) and/or a relative deviation of a phase comparative value (φM) determined by the modulation valuation unit (51) from a phase reference value (RWφ).

7. The drop-detection device according to claim 6, having a reference value storage device, in which an amplitude reference value (RWA), which is formed from a plurality of amplitude comparative values (AM) from previously registered modulation signals (MOD) and/or a phase reference value (RWφ), which is formed from a plurality of phase comparative values (φM) from previously recorded modulation signals (MOD), are stored as variable reference values.

8. The drop-detection device according to claim 6, wherein the detection filter unit (52) is configured to determine if the determined relative deviation of the amplitude comparative value (AM) from the amplitude reference value (RWA) and/or the determined relative deviation of the phase comparative value (φM) from the phase reference value (RWφ) does not exceed a relative lower and upper limit.

9. The drop-detection device according to claim 6, wherein the detection filter unit (52) is configured to determine if the absolute amplitude reference value (RWA) used for determining the deviation of the amplitude comparative value (AM) is within a pre-determined absolute amplitude reference value range (ARI) and/or if the absolute phase reference value (RWφ) used to determine the deviation of the phase comparative value (φM) is within a predetermined absolute phase reference range (PRI).

10. The drop-detection device according to claim 1, wherein the modulation unit (30) comprises a light-emission unit (31) and a light-sensor unit (32) and/or a capacitive sensor unit.

11. The drop-detection device according to claim 1, wherein the signal-generation unit (20) is configured to generate a square-wave signal as a carrier signal (TS).

12. A method (600) of detecting a drop (TR) of a metering valve (DV), having the steps:

generation of a carrier signal (TS) with a defined pulse frequency, applying a carrier signal (TS) to a trajectory (T), on which a possible drop (TR) is moving, which is dispensed by the metering valve (DV), so that it is ensured that a modulated measurement signal (MS) is generated by a physical interaction of the carrier signal (TS) with a drop to be detected (TR), determining if a drop (TR) has been dispensed by the metering valve (DV) taking the defined pulse frequency into consideration by carrying out a quadrature demodulation of the measurement signal in order to determine an in-phase component (I) and a quadrature component (Q), determining, based upon the in-phase component (I) and the quadrature component (Q), the amount of amplitude and/or the phase of the modulation signal (MOD) based on the modulated measurement signal (MS), determining amplitude derivative values (dA/dt), comprising the time derivative of the amplitude value and/or phase derivative values (4/dt), comprising the time derivative of the phase of the modulation signal (MOD), and combining at a fixed time interval (IT), a predetermined number of amplitude derivative values (dA/dt) into amplitude comparative values (AM) and/or a predetermined number of phase derivative values (dφ/dt) into phase comparative values (φM).

\* \* \* \* \*